United States Patent
Shinoda et al.

(10) Patent No.: US 8,129,632 B2
(45) Date of Patent: Mar. 6, 2012

(54) PORTABLE ELECTRONIC DEVICE

(75) Inventors: Takao Shinoda, Kawasaki (JP); Shingo Yamaguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/453,742

(22) Filed: May 20, 2009

(65) Prior Publication Data

US 2009/0229878 A1    Sep. 17, 2009

Related U.S. Application Data

(63) Continuation of application No. PCT/JP2007/072299, filed on Nov. 16, 2007.

(30) Foreign Application Priority Data

Nov. 24, 2006    (JP) ................... 2006-316760

(51) Int. Cl.
*H01L 23/045*    (2006.01)
*H01L 23/055*    (2006.01)

(52) U.S. Cl. ........................ 174/554; 174/564

(58) Field of Classification Search ........... 174/564, 174/50.63, 481, 60, 554
See application file for complete search history.

(56) References Cited

U.S. PATENT DOCUMENTS

| | | | | |
|---|---|---|---|---|
| 4,195,201 A | * | 3/1980 | Gryl et al. .................. 178/46 |
| 4,839,716 A | * | 6/1989 | Butt ............................. 257/660 |
| 5,093,989 A | * | 3/1992 | Beltz ............................ 29/878 |
| 5,247,424 A | * | 9/1993 | Harris et al. ................ 361/704 |
| 5,435,058 A | * | 7/1995 | Breit et al. ................... 29/854 |
| 5,491,300 A | * | 2/1996 | Huppenthal et al. ......... 174/151 |
| 6,521,989 B2 | * | 2/2003 | Zhou ........................... 257/698 |
| 2002/0005574 A1 | * | 1/2002 | Zhou ........................... 257/680 |
| 2002/0079653 A1 | | 6/2002 | Noguchi et al. |
| 2006/0032653 A1 | | 2/2006 | Minoshima et al. |
| 2006/0185881 A1 | | 8/2006 | Minoshima et al. |
| 2010/0176533 A1 | * | 7/2010 | Hayashi et al. ............. 264/252 |

FOREIGN PATENT DOCUMENTS

| | | |
|---|---|---|
| GB | 2 295 850 A | 6/1996 |
| JP | 6-252519 | 9/1994 |
| JP | 2002-198664 | 7/2002 |
| JP | 2003-142836 | 5/2003 |
| JP | 2004-135012 | 4/2004 |
| JP | 2004-214927 | 7/2004 |
| JP | 2005-32752 | 2/2005 |
| JP | 2006-093510 | 4/2006 |

(Continued)

OTHER PUBLICATIONS

International Search Report for PCT/JP2007/072299, mailed Jan. 15, 2008.

(Continued)

*Primary Examiner* — Hung Ngo
(74) *Attorney, Agent, or Firm* — Staas & Halsey LLP

(57) ABSTRACT

In order to provide a portable electronic device improved in water tightness by a simple method, the portable electronic device includes: a housing assembled from a plurality of housing pieces via a sealing member and having a built-in electronic circuit; and a flat cable group in which a plurality of flat cables having a plurality of electric signal lines aligned and connected to the electronic circuit are stacked in a thickness direction, and adjacent flat cables are bonded to each other via an adhesive material at least at a point in an overall length, the flat cable group being integrally molded with the sealing member of the housing at the point.

3 Claims, 6 Drawing Sheets

FOREIGN PATENT DOCUMENTS

| | | |
|---|---|---|
| JP | 2006-196590 | 7/2006 |
| JP | 2007-237592 | 9/2007 |
| WO | 03/085793 A1 | 10/2003 |

OTHER PUBLICATIONS

English Translation of the International Preliminary Report of Patentability and the Written Opinion of the International Search Authority issued Jun. 4, 2009 in corresponding International Patent Application PCT/JP2007/072299.

Japanese Office Action dated Sep. 8, 2009 and issued in corresponding Japanese Patent Application 2008-545384.

European Search Report dated May 27, 2010 issued in corresponding European Patent Application 07832029.8.

* cited by examiner

PORTABLE ELECTRONIC DEVICE

CROSS-REFERENCE TO RELATED APPLICATIONS

This application is a continuation application, filed under 35 U.S.C. §111(a), of International Application PCT/JP2007/072299, filed Nov. 16, 2007, it being further noted that priority is based upon Japanese Patent Application No. 2006-316760, filed on Nov. 24, 2006, the entire contents of which are incorporated herein by reference.

TECHNICAL FIELD

The present invention relates to a portable electronic device with a built-in electronic circuit.

BACKGROUND ART

Portable electronic devices that have become greatly widespread in recent years are frequently used outdoors and therefore they need to be waterproof to some extent. In this respect, there is a suggestion that contributes to the realization of water resistance (see, for example, International Publication Pamphlet No. WO03/085793).

The above-mentioned document describes a process for producing a molded gasket that is a resin sealing member to be interposed between pieces of a housing when the housing is assembled. According to the invention proposed in this document, a part of a flexible flat cable (hereinafter referred to as "FCC") is made integral with the gasket by pouring a resin into a mold after the FCC is disposed in the mold.

This type of gasket can be used, for example, in a folding portable telephone having a main unit with keys and a display unit with a display screen. In this example, the main unit and the display unit are each assembled, and a FFC partially integral with the gasket is used for communications between the main unit and the display unit. This makes it possible to prevent the entry of moisture into the portable telephone from a gap between the FFC and the gasket.

Incidentally, in late years, portable electronic devices such as portable telephones have become more sophisticated in functionality, requiring more signal lines than conventional devices. To keep up with this trend, it is conceivable to stack plural FCCs in the thickness direction. However, when the technique proposed in the above-mentioned document is employed for bonding the FFCs stacked in the thickness direction, it is necessary to carefully pour a resin to fill each space between the FCCs. Even if this careful filling is attempted, there are no guarantees that the resin can be appropriately poured to fill the space between the FCCs. When the filling of the resin is not appropriate, additional treatment for improving the sealing effect will be subsequently required, which makes the entire process complicated. In addition, use of a sealant requires such conditions that the sealant must be cured beforehand after being poured into the space between FCCs and the sealant needs to surely cover the entire width of the FCC, which is disadvantageous in terms of productivity.

In view of the above circumstances, it is an object of the present invention to provide a portable electronic device whose water resistance is improved by a simple method.

DISCLOSURE OF THE INVENTION

To achieve the above object, a portable electronic device of the present invention includes:
a housing assembled from a plurality of housing pieces via a sealing member and having a built-in electronic circuit; and
a flat cable group in which a plurality of flat cables having a plurality of electric signal lines aligned and connected to the electronic circuit are stacked in a thickness direction, and adjacent flat cables are bonded to each other via an adhesive material at least at a point in an overall length, the flat cable group being integrally molded with the sealing member of the housing at the point.

In the portable electronic device of the present invention, the sealing effect between adjacent flat cables is improved by a simple method that is to bond these flat cables to each other with an adhesive material. Also, the flat cable group has a part in which the flat cables are bonded to each other via the adhesive material and which is tightly surrounded by the material of the sealing member to a great extent because this part is integrally molded with the sealing member. In other words, water tightness of the portable electronic device according to the present invention is improved by a simple technique.

Further, in the portable electronic device of the present invention, it is preferable that adjacent cables of the flat cable group are bonded to each other via an adhesive material having a width equal to or greater than a width of the flat cable.

When the width of the adhesive material is smaller than the width of the flat cable, a gap is formed between the adjacent flat cables, specifically, in an area where the adhesive material is absent, making it impossible to improve the sealing effect without filling the gap with the material of the sealing member. In contrast, when the adjacent flat cables are bonded to each other with an adhesive material whose width is equal to or greater than the width of the flat cable, the sealing effect can be readily improved.

According to the present invention, it is possible to provide a portable electronic device whose water tightness is improved by a simple method.

BEST MODE FOR CARRYING OUT THE INVENTION

An embodiment of the present invention will be described.

Figure 1:
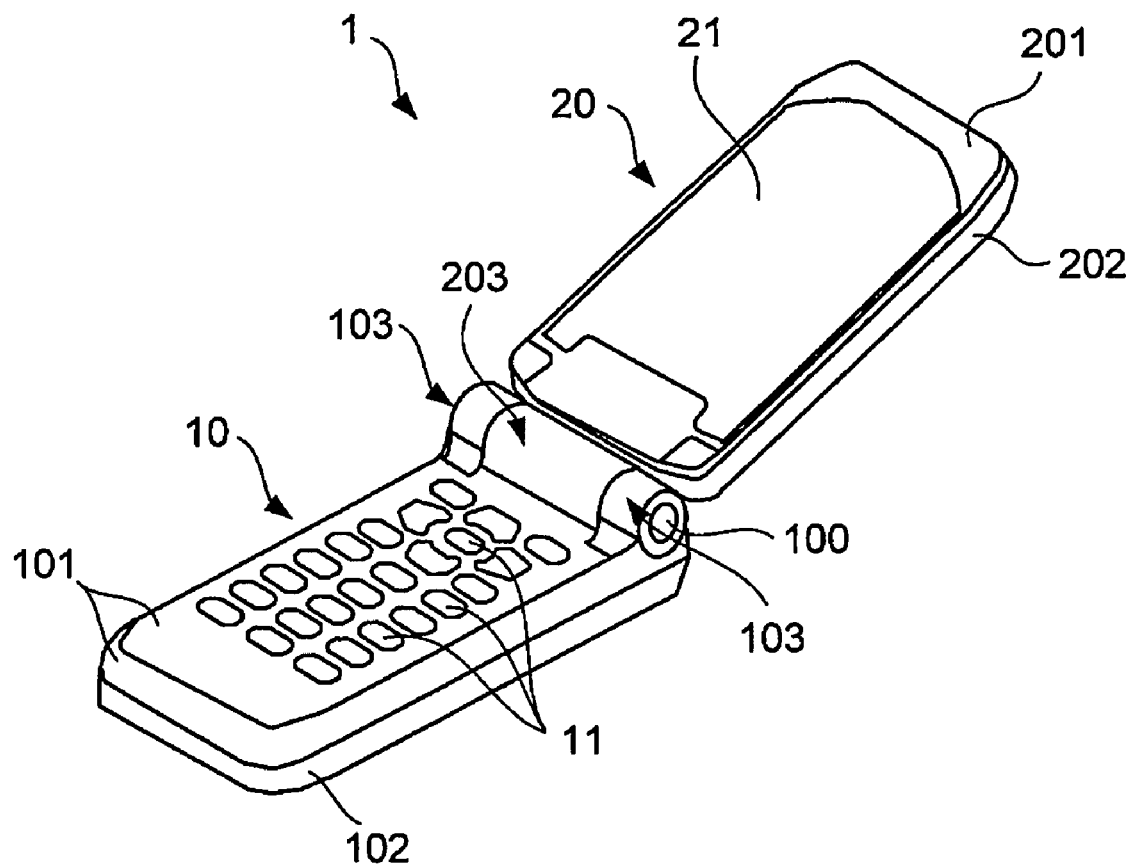
FIG. 1. is an external perspective view of one embodiment of the portable electronic device according to the present invention.

FIG. 1. is an external perspective view of one embodiment of the portable electronic device according to the present invention.

A portable telephone 1 of the present embodiment illustrated in FIG. 1 includes a main unit 10, a display unit 20, and a pivot 100. The main unit 10 has a first housing piece 101 with keys 11 disposed on its front surface and a second housing piece 102 combined with the first housing piece 101. The display unit 20 has a first housing piece 201 in which an LCD screen 21 is fitted and a second housing piece 202 combined with the first housing piece 201. The pivot 100 links the main unit 10 and the display unit 20.

The main unit 10 and the display unit 20 are changeable between a closed state in which the keys 11 and the LCD screen 21 closely face each other and an open state illustrated in FIG. 1.

In the portable telephone 1 illustrated in FIG. 1, communications between the main unit 10 and the display unit 20 are carried out via a flexible flat cable (hereinafter referred to as "FFC") group including two FCCs stacked in the thickness direction. The FCC group is inserted into a hinge 103 of the main unit 10 and a hinge 203 of the display unit 20. The FCC used here is a vinyl strip in which plural electric signal lines are laid along the longitudinal direction.

Figure 2:
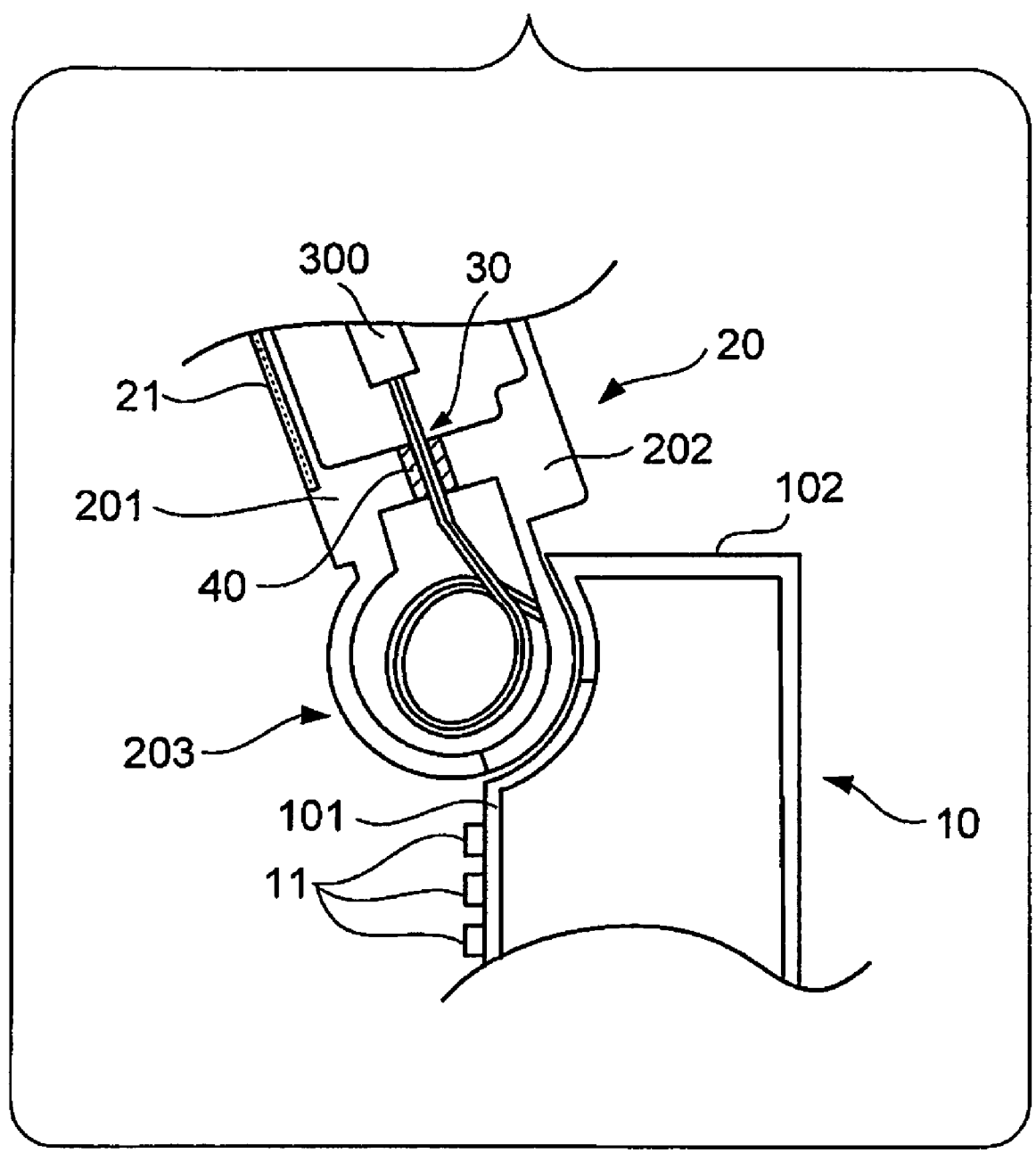
FIG. 2 is a cross-sectional view of a hinge of a display unit and a portion around this hinge.

FIG. 2 is a cross-sectional view of the hinge of the display unit and a portion around this hinge.

FIG. 2 illustrates a part of the display unit 20. In particular, FIG. 2 illustrates the first housing piece 201 in which the LCD screen 21 is fitted, the second housing piece 202 that forms the front surface of the portable telephone 1 in the open state mentioned above, and a gasket 40 interposed between these two pieces.

FIG. 2 also illustrates the hinge 203 formed by an end of the first housing piece 201 and an end of the second housing piece 202, and the FFC group 30 inserted into the hinge 203. A part of the FFC group 30 is integrally molded with the gasket 40, and an end of the FFC group 30 is connected to an electric substrate 300 built in the display unit 20. Further, the two FFCs are bonded to each other with a double-faced tape at a position where the part of the FFC group 30 is integral with the gasket 40, which will be described later more in detail. FIG. 2 also illustrates the main unit 10 including the first housing piece 101 with keys 11 and the second housing piece 102 that forms a surface of the portable telephone 1 in the closed state.

Figure 3:
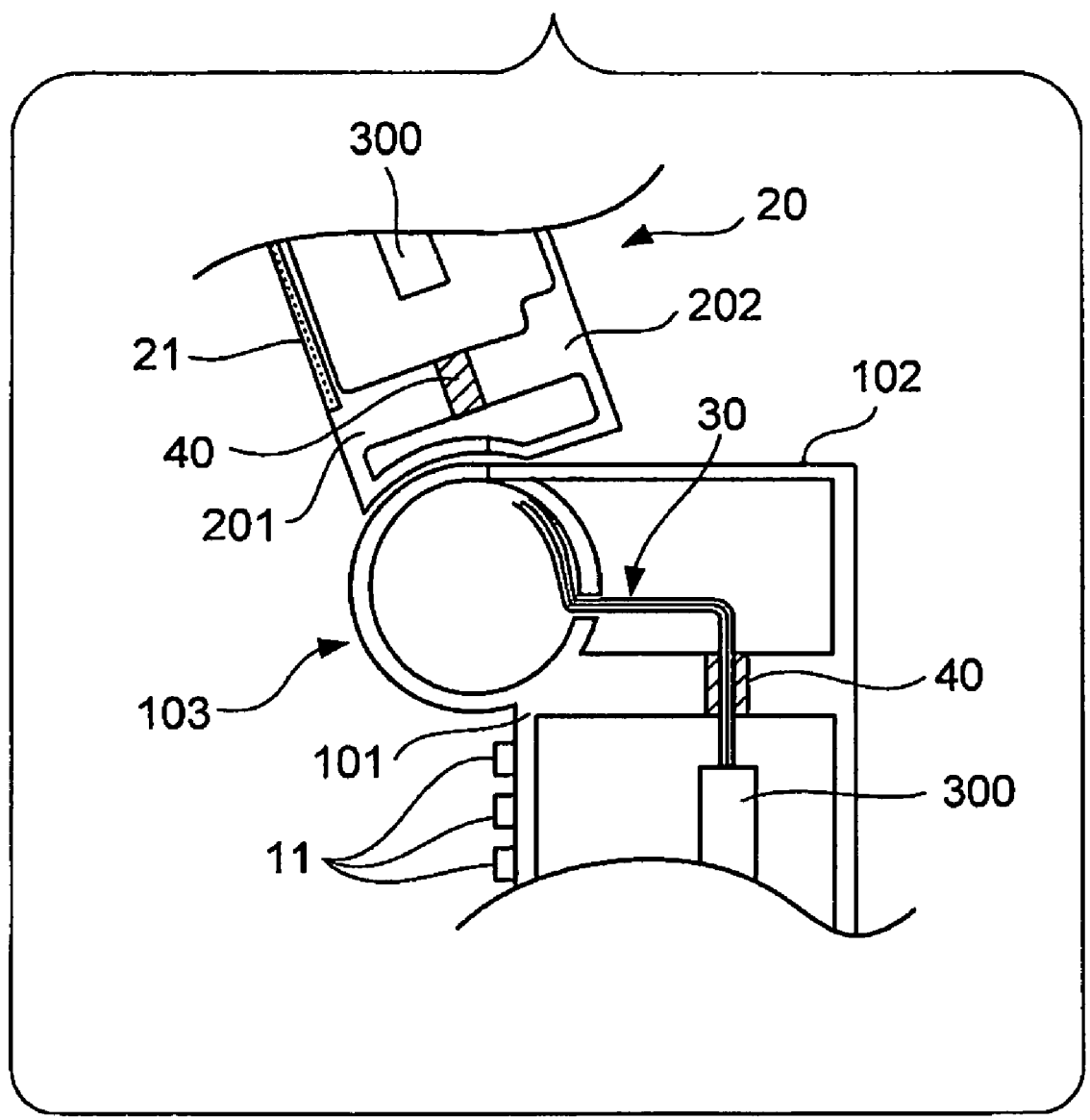
FIG. 3 is a cross-sectional view of a hinge of a main unit and a portion around this hinge.

FIG. 3 is a cross-sectional view of the hinge of the main unit and a portion around this hinge.

FIG. 3 illustrates a part of the main unit 10. In particular, FIG. 3 illustrates: the first housing piece 101 in which the keys 11 are fitted, the second housing piece 102 that forms a surface of the portable telephone 1 in the closed state, and a gasket 40 with which a part of the FFC group 30 is integrally molded like the gasket 40 of the display unit 20.

FIG. 3 also illustrates the hinge 103 formed by an end of the first housing piece 101 and an end of the second housing piece 102, and the FFC group 30 inserted into the hinge 103.

The main unit 10 and the display unit 20 illustrated in FIG. 2 and FIG. 3 are electrically connected to each other via the FFC group 30 inserted into both of the hinge 103 and the hinge 203. Incidentally, an illustration of the pivot 100 is omitted in FIG. 2 and FIG. 3.

Now, there will be described the gasket 40 with which a part of the FFC group 30 is integrally molded.

Figure 4:
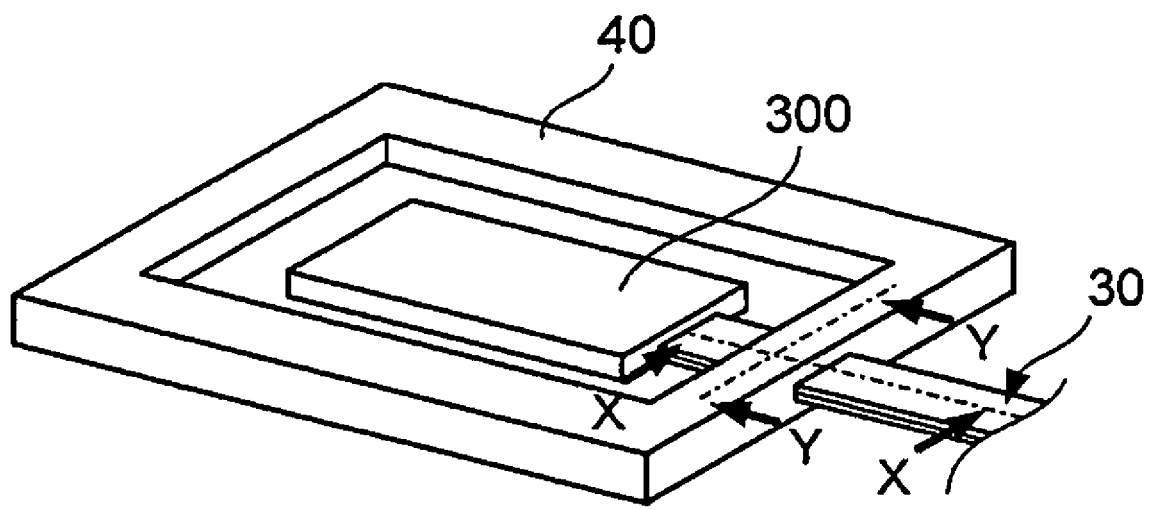
FIG. 4 is a diagram conceptually illustrating a molded gasket with which a part of an FCC group is integral.

FIG. 4 is a diagram conceptually illustrating the molded gasket with which a part of the FCC group is integral.

FIG. 4 illustrates the gasket 40 with which a part of the FFC group 30 is made integral by molding. In the portable telephone 1 of the present embodiment, the gasket 40 with which the part of the FFC group 30 is integrally molded is interposed between the first housing piece 101 and the second housing piece 102 in the main unit 10, and another similar gasket 40 is also interposed between the first housing piece 201 and the second housing piece 202 in the display unit 20. Incidentally, FIG. 4 also illustrates the electric substrate 300 connected to an end of each FFC of the FFC group 30 and built in each of the main unit 10 and the display unit 20. The above-described part of the FFC group 30 refers to the periphery of a portion where the adjacent FFCs are bonded to each other with a double-faced tape.

Figure 5:
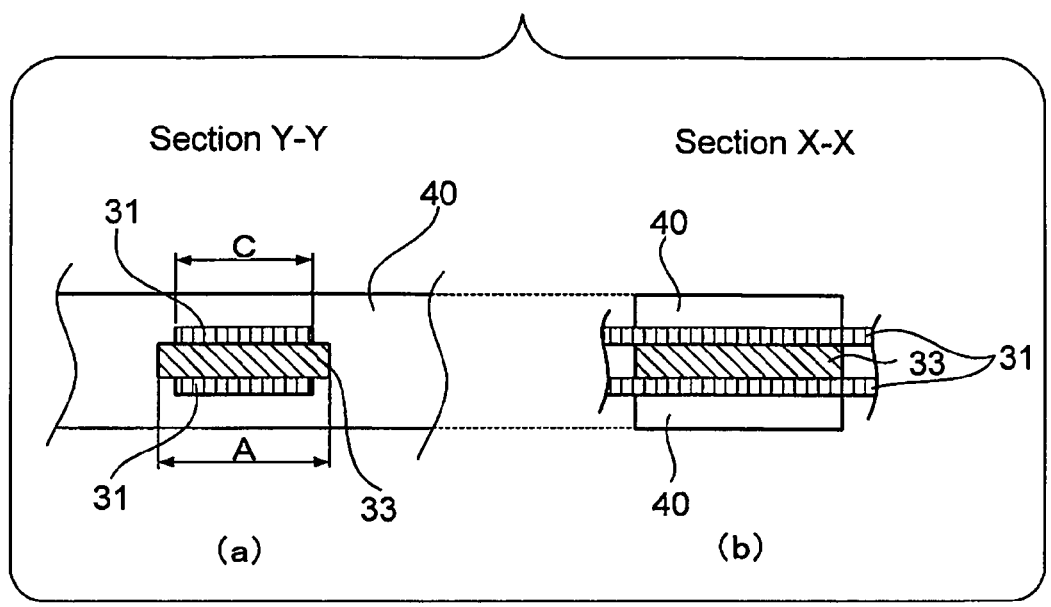
FIG. 5 is a conceptual diagram illustrating cross sections of a part of the FFC group taken along a line X-X and a line Y-Y illustrated in FIG. 4, the illustrated part being integrally molded with the gasket.

FIG. 5 is a conceptual diagram illustrating cross sections of a part of the FFC group taken along a line X-X and a line Y-Y illustrated in FIG. 4, the illustrated part being integrally molded with the gasket.

Part (a) of FIG. 5 illustrates a cross section, taken along the line Y-Y, of the gasket 40 with which the FFC group 30 is integrally molded. The FFC group 30 includes two FFCs 31 bonded to each other with a double-faced tape 33. The width of the FFC 31 is "C" while the width of the double-faced tape 33 is "A" that is greater than "C." Part (b) of FIG. 5 illustrates a cross section, taken along the line X-X, of the FFC group 30 integral with the gasket 40.

As illustrated in FIG. 5, in the portable telephone 1 of the present embodiment, the sealing effect between the adjacent FFCs in the above-described part of the FFC group 30 is improved by a simple method of bonding these FFCs with the double-faced tape 33. Further, the part of the FFC group 30 where the FFCs are bonded to each other with the double-faced tape 33 is tightly surrounded by the material of the gasket 40 to a great extent, because this part of the FFC group 30 is integrally molded with the gasket 40. In other words, the water tightness of the portable telephone 1 in the present embodiment is improved by a simple technique. Meanwhile, if the width of the double-faced tape 33 is smaller than the width of the FFCs 31, a gap is formed between the adjacent FFCs, specifically, at a portion where the double-faced tape 33 is absent. In this case, if this gap is not filled with the material of the gasket 40, the sealing effect cannot be improved. In contrast, according to the portable telephone 1 of the present embodiment, the adjacent FFCs are bonded to each other via the double-faced tape 33 whose width is equal to or greater than the width of the FFCs 31 and thus the sealing effect is greatly improved. Incidentally, the present embodiment has been described so far by taking the stacked two FFCs 31 of the same width as an example. However, the present invention does not require the widths of the FFCs 31 to be the same, and the FFC group may be composed of FFCs 31 and 32 of different widths as illustrated FIG. 6, which will be described below.

Figure 6:
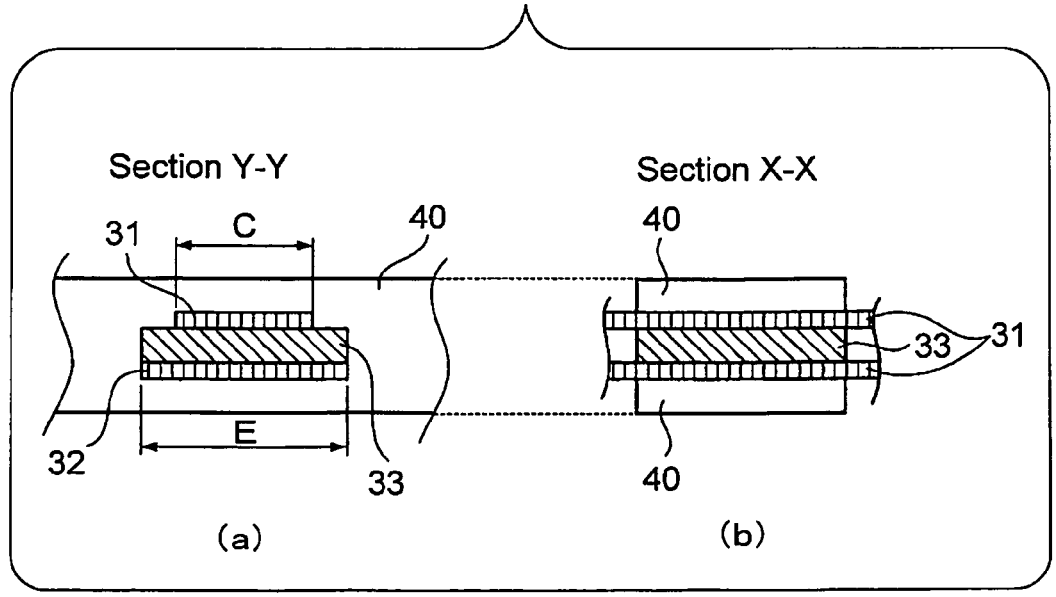
FIG. 6. is a conceptual diagram of an FCC group including two FFCs of different widths.

FIG. 6. is a conceptual diagram of an FCC group including two FFCs of different widths.

Part (a) of FIG. 6 illustrates a cross section, taken along the line Y-Y, of the gasket 40 integrally molded with a part of the FFC group in which the FFC 31 having a width "C" and the FFC 32 having a width "E" are bonded to each other with a double-faced tape 33 having the width "E." The width "E" of the FFC 32 and the double-faced tape 33 is greater than the width "C" of the FFC 31. The present invention may employ the FFC group illustrated in FIG. 6. Part (b) of FIG. 6 illustrates a cross section taken along the line X-X.

Described so far are examples in which each FFC group includes two stacked FFCs. However, each FFC group may include three FFCs 31 as illustrated in FIG. 7, which will be described below.

Figure 7:
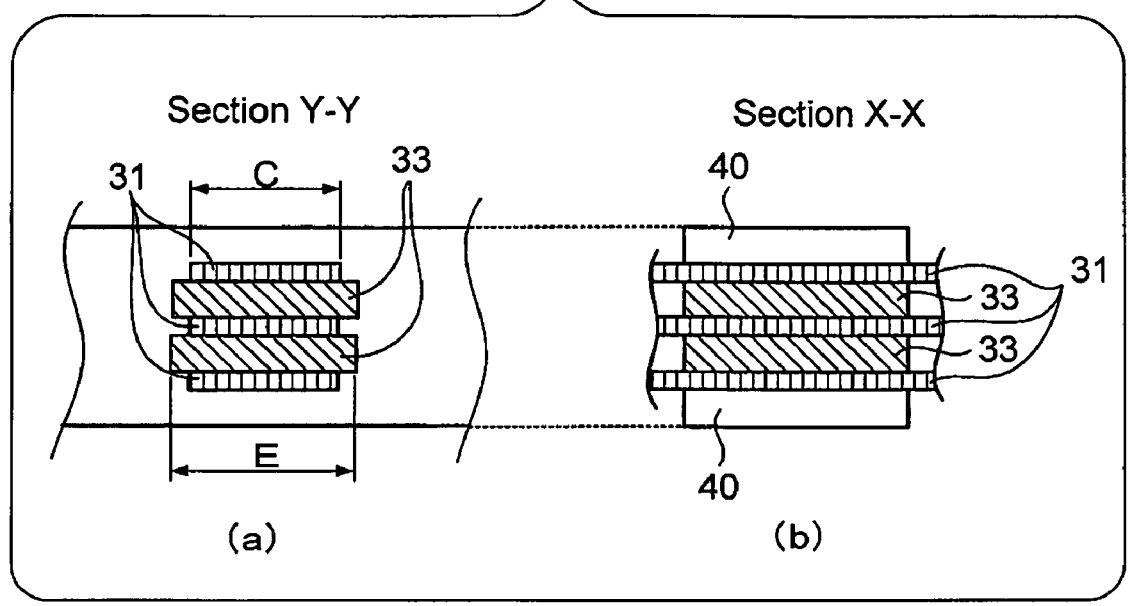
FIG. 7 is a conceptual diagram of an FCC group including three stacked FFCs of the same width.

FIG. 7 is a conceptual diagram of an FCC group including three stacked FFCs of the same width.

Part (a) of FIG. 7 illustrates a cross section, taken the line Y-Y, of the gasket 40 integrally molded with the FFC group including three FFCs 31. The three FFCs 31 have a width "C" and are bonded to each other via a double-faced tape 33 of a width "E". The width "E" of the double-faced tape 33 is greater than the width "C" of the FFCs 31. The present invention may employ this type of FFC group. Also, a cross section taken along the line X-X is illustrated in part (b) of FIG. 7.

FIG. 7 illustrates the example in which the double-faced tapes 33 of the same size in the longitudinal direction of the FFC are employed. However, the double-faced tapes 33 may vary in size.

Figure 8:
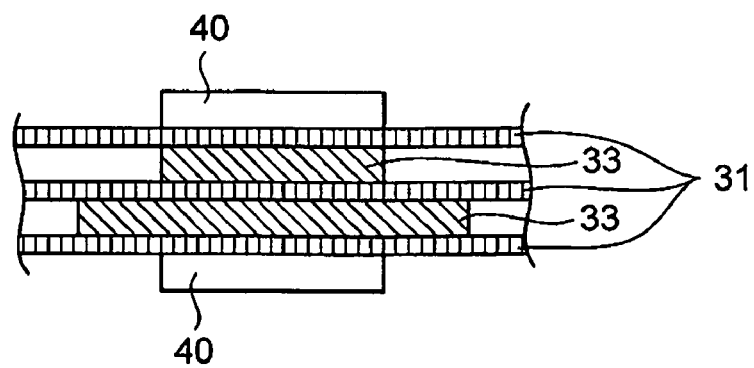
FIG. 8 is a conceptual diagram illustrating double-faced tapes varying in size (in longitudinal direction of FFC) in a cross section X-X.

FIG. 8 is a conceptual diagram illustrating the double-faced tapes varying in size (in longitudinal direction of FFC) in a cross section X-X.

FIG. 8 illustrates a cross section taken along the line X-X. Double-faced tapes 33 each interposed between adjacent FFCs 31 have different lengths (in longitudinal direction of FFC), so that a load imposed on the FFCs 31 when the FFCs 31 are bent is dispersed, thereby maintaining the life in the state of being bent.

Incidentally, there have been described the examples in which the double-faced tape is used to bond the adjacent FFCs together. However, the present invention is not limited to the double-faced tape and may employ any kind of material as long as the material is adhesive. Further, there have been described the examples in which the width of the double-faced tape is equal to or greater than the width of the FFCs. However, even when the width of the double-faced tape is smaller than the width of the FFCs, basic effects of the present invention will not be reduced. Furthermore, the portable telephone has been described above as an example, but the present invention is not limited to this case.

What is claimed is:

1. A portable electronic device comprising:
   a housing assembled from a plurality of housing pieces via a sealing member and having a built-in electronic circuit; and
   a flat cable group in which a plurality of flat cables connected to the electronic circuit are stacked in a thickness direction, the flat cable group having a length and having adjacent flat cables that are bonded to each other between the adjacent flat cables, the adjacent flat cables having a first position in which each of the adjacent flat cables is bonded along the length of the flat cable group and a second position in which each of the adjacent flat cables is not bonded along the length of the flat cable group, the plurality of flat cables being interposed between the sealing member at the first position where the adjacent flat cables are bonded such that the flat cable group is integrally molded with the sealing member.

2. The portable electronic device according to claim 1, wherein adjacent cables of the flat cable group are bonded to each other via an adhesive material having a width equal to or greater than a width of the flat cable.

3. The portable electronic device according to claim 1, wherein the adhesive material is a double-faced tape type of material.

* * * * *